(12) United States Patent
Iwasaki et al.

(10) Patent No.: US 10,261,866 B2
(45) Date of Patent: *Apr. 16, 2019

(54) RESTORING DATA

(71) Applicant: International Business Machines Corporation, Armonk, NY (US)

(72) Inventors: Norie Iwasaki, Fujisawa (JP); Sosuke Matsui, Yokohama (JP); Tsuyoshi Miyamura, Yokohama (JP); Terue Watanabe, Tokyo (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 236 days.

This patent is subject to a terminal disclaimer.

(21) Appl. No.: 14/800,718

(22) Filed: Jul. 16, 2015

(65) Prior Publication Data
US 2016/0062671 A1 Mar. 3, 2016

(30) Foreign Application Priority Data
Aug. 26, 2014 (JP) .................. 2014-171687

(51) Int. Cl.
*G06F 11/14* (2006.01)
*G06F 3/06* (2006.01)
*G06F 17/30* (2006.01)

(52) U.S. Cl.
CPC .......... *G06F 11/1469* (2013.01); *G06F 3/065* (2013.01); *G06F 3/0611* (2013.01);
(Continued)

(58) Field of Classification Search
CPC ................................................. G06F 11/1451
(Continued)

(56) References Cited

U.S. PATENT DOCUMENTS 7,650,341 B1 1/2010 Oratovsky et al.
8,126,847 B1 2/2012 Zheng et al.
(Continued)

FOREIGN PATENT DOCUMENTS

JP 2000353118 A 12/2000
JP 2002091815 A 3/2002
(Continued)

OTHER PUBLICATIONS

Hasegawa et al., "A Method to Improve the Restoration of Filed from Tape File Systems", IBM Professionals' Papers, ProVISION No. 72 / Winter 2012. IBM Japan, 2012. No. 72, pp. 97-103.
(Continued)

*Primary Examiner* — Hares Jami
*Assistant Examiner* — Andrew N Ho
(74) *Attorney, Agent, or Firm* — Stosch Sabo

(57) ABSTRACT

Restoring a data processing system. Files on one or more storage devices of a data processing system are backed up to magnetic tape recording media. Metadata associated with the backed up files is recorded, including magnetic tape identification and tape location for each backed up file. Files on the one or more storage devices are identified that meet a selection policy for files required for rapid restoration of the data processing system. An index list is generated of the identified files and their associated magnetic tape metadata. The index list is sorted by magnetic tape identification and magnetic tape location. In response to a request to restore the data processing system, the identified files on the sorted index list are restored in magnetic tape identification and magnetic tape location sort order. Operation of the restored data processing system is then begun in accordance with the restored files.

1 Claim, 13 Drawing Sheets

(52) U.S. Cl.
CPC ......... *G06F 3/0619* (2013.01); *G06F 3/0643* (2013.01); *G06F 3/0685* (2013.01); *G06F 3/0686* (2013.01); *G06F 11/1412* (2013.01); *G06F 17/3007* (2013.01); *G06F 17/30088* (2013.01); *G06F 17/30117* (2013.01); *G06F 17/30321* (2013.01); *G06F 2201/84* (2013.01)

(58) Field of Classification Search
USPC ........................................................ 707/640
See application file for complete search history.

(56) References Cited

U.S. PATENT DOCUMENTS

| | | | |
|---|---|---|---|
| 8,127,095 B1* | 2/2012 | Colgrove | G06F 11/1435 711/117 |
| 9,124,611 B2 | 9/2015 | Littlefield et al. | |
| 2001/0013102 A1* | 8/2001 | Tsuchiya | G06F 11/1464 714/4.5 |
| 2002/0002561 A1* | 1/2002 | Higashiura | G06F 11/14 707/204 |
| 2003/0004980 A1 | 1/2003 | Kishi et al. | |
| 2005/0021566 A1* | 1/2005 | Mu | G06F 11/1458 707/200 |
| 2005/0177767 A1* | 8/2005 | Furuya | G06F 11/1451 714/13 |
| 2008/0184068 A1* | 7/2008 | Mogi | G06F 11/1435 714/15 |
| 2010/0076934 A1 | 3/2010 | Pershin et al. | |
| 2010/0082544 A1 | 4/2010 | Weaver | |
| 2011/0238625 A1 | 9/2011 | Hamaguchi et al. | |
| 2011/0238906 A1* | 9/2011 | Amir | G06F 3/0611 711/111 |
| 2013/0205082 A1 | 8/2013 | Murayama et al. | |
| 2013/0275541 A1 | 10/2013 | Wang et al. | |
| 2017/0097872 A1 | 4/2017 | Pandey et al. | |

FOREIGN PATENT DOCUMENTS

| | | |
|---|---|---|
| JP | 2003528399 A | 9/2003 |
| JP | 2005018757 A | 1/2005 |
| JP | 2005018758 A | 1/2005 |
| JP | 2005165486 A | 6/2005 |
| JP | 2005190139 A | 7/2005 |
| JP | 2005332426 A | 12/2005 |
| JP | 2008501183 A | 1/2008 |
| JP | 2008171387 A | 7/2008 |
| JP | 2009163852 A | 7/2009 |
| JP | 2010508608 A | 3/2010 |
| JP | 2011201426 A | 10/2011 |
| JP | 2012530285 A | 11/2012 |
| JP | 2013508834 A | 3/2013 |
| JP | 2014123254 A | 7/2014 |

OTHER PUBLICATIONS

Application No. 2014-171687 (Japan), titled "Method and Program for Restoring Data and Data Processing System," filed on Aug. 26, 2014, pp. 1-56.

IBM, "IBM Spectrum Archive Enterprise Edition: Enabling the most-effective storage for managing explosive data growth", http://www-03.ibm.com/systems/storage/tape/ltfs-ee/ Last accessed Jan. 31, 2017. 1 page.

Hasegawa, et al., "Improvement-in-the-speed of file restoration and file system for tapes", ProVision, IBM Japan, 2012. No. 72, pp. 97-103.

Reasons for Refusal, JP Office Action, Application No. 2014-171687, dated Apr. 21, 2016. 4 pages.

Decision to Grant a Patent, Japan Application No. 2014-171687. Jul. 1, 2016. 2 pages.

List of IBM Patents or Patent Applications Treated as Related, Feb. 1, 2017. 2 pages.

Iwasaki, et al., "Restoring Data" U.S. Appl. No. 15/423,651, filed Feb. 3, 2017.

* cited by examiner

```
<directory>
    <fileuid>4<fileuid>
    <name>directory2</name>
    <readonly>false</readonly>
    <creationtime>2013-02-16T19:13:43. 007872849Z</creationtime>
    <changetime>2013-02-16T19:13:46. 512350773Z</changetime>
    <modifytime>2013-02-16T19:13:46. 512350773Z</modifytime>
    <accesstime>2013-02-16T19:13:43. 007872849Z</accsesstime>
    <backuptime>2013-02-16T19:13:43. 007872849Z</backuptime>
    <contents>
        <file>
            <fileuid>5</fileuid>
            <name>sparse_file.bin</name>
            <length>20000000</length>
            <readonly>false</readonly>
            <creationtime>2013-02-16T19:13:45. 012828533Z</creationtime>
            <changetime>2013-02-16T19:13:46. 509553802Z</changetime>
            <modifytime>2013-02-16T19:13:45. 509553802Z</modifytime>
            <accesstime>2013-02-16T19:13:45. 012828533Z</accsesstime>
            <backuptime>2013-02-17T19:15:34. 012828533Z</backuptime>
            <extentinfo>
                <extent>
                    <partition>b</partition>
                    <startblock>8</startblock>
                    <byteoffset>0<0/byteoffset>
                    <bytecount>720000</bytecount>
                    <fileoffset>0</fileoffset>
                </extent>
            </extentinfo>
        </file>
    </contents>
</directory>
```

*FIG. 4*

```
/gpfs (gpfs root directory)
    |
    + file1
    + file2
    + dir1
        |
        + file3
        + file4
        + dir2
            |
            + file5
            + file6

/ltfs (tape root directory)
    |------------------------------------------|
    + tapeA/gpfs                                + tapeA/.LTFSEE_DATA
    |                                           |
    |   + file1 (symlink) --------------------> + CLID-FSID-IGEN1-INO1-SNID1
    |   + file2 (symlink) --------------------> + CLID-FSID-IGEN2-INO2-SNID2
    |   + dir1                                  |
    |       |                                   |
    |       + file3 (symlink) ----------------> + CLID-FSID-IGEN3-INO3-SNID3
    |
    |------------------------------------------|
    + tapeB/gpfs                                + tapeB/.LTFSEE_DATA
        |                                       |
        + file1 (symlink) --------------------> + CLID-FSID-IGEN1-INO1-SNID1
        + dir1                                  |
            |                                   |
            + file4 (symlink) ----------------> + CLID-FSID-IGEN4-INO4-SNID4
            + dir2                              |
                |                               |
                + file5 (symlink) ------------> + CLID-FSID-IGEN5-INO5-SNID5
                + file6 (symlink) ------------> + CLID-FSID-IGEN6-INO6-SNID6
```

*FIG. 13*

RESTORING DATA

BACKGROUND

The present invention relates to a method for restoring a plurality of pieces of data into a data processing system.

A data processing operation site prepares for disaster by storing data in the operation site and also backing up the data in a recording medium. An example of the recording medium is a low-cost magnetic tape medium (a tape medium).

The tape medium to which data is backed up is transported to a data processing restoration site prepared for disasters (a restoration site) and is stored therein. In the restoration site, a data processing system composed of the same devices as those in the operation site is built in advance. Thus, even if a disaster occurs in the operation site, the data can be restored to the same state as that in the operation site from the stored tape medium in the restoration site, so that operations can be restarted at the point where the data is backed up.

Conventional data restoration has been performed by reading all files stored in a tape medium and then writing the files to a hard disk drive (HDD), a solid state drive (SSD), or the like in a restoration site. Restoring a large number of files or large-sized data takes much time, thus hindering rapid resumption of operations.

Operation sites adopt a cluster system in which a plurality of computers are connected, so that even if one computer halts due to a failure or the like, the entire system does not halt, allowing the processing to be continued, during which the failed computer can be repaired or replaced. In this cluster system, the individual computers are called nodes, and distributed data storage or backup to storage devices (disks) that the individual nodes manage is performed using a software component, such as a general parallel file system (GPFS).

Data backup and restoration using the GPFS may be executed by a method as shown in FIG. 1. As shown in FIG. 1, the operation site has a system configuration including a file system 10 serving as a GPFS, a disk 11 serving as a storage device from/to which data is read and written at high speed, and a tape pool 12 from/to which data is read and written at low speed. The restoration site has the same system configuration as that of the operation site, including a file system 13, a disk 14, and a tape pool 15.

In a normal operation for storing data in the operation site, the file system 10 stores a copy of the data, as a file, in the disk 11 and also in a tape medium 16 in the tape pool 12. At backup, the file system 10 stores only inode information including attribute information (meta-information) of the file. The state in which the data of the file is stored in both the disk 11 and the tape medium 16 is called a pre-migrated state.

At the restoration site, the meta-information on the file is restored by restoring the inode information to the file system 13, the state of the file is changed to a state in which the data of the file is stored only in a tape medium (a migrated state), and the restoration is completed. Since the data restoration method eliminates the need for reading all the files from the tape medium 16 and writing the files to the disk 14 in the restoration site, operations can be resumed rapidly without taking much time for restoration.

However, data of all the files are present only in the tape medium 16 after the operations are resumed. Thus, to make the first access to the files, it is necessary to read the files from the tape medium 16, which takes more time to read data from the tape medium 16 than from the disk 14.

As shown in FIG. 2, a system is provided in which a file list from which files that may be used quickly after restoration can be selected in accordance with preset rules, and files included in the file list are read to the disk 14 in advance. This system is referred to as preferred recall. The files to be used quickly after restoration can be from the disk 14 at high speed rather than from the tape media 16.

An example standard of a magnetic tape storage device for large-volume high-speed reading and writing is LTO®. The latest LTO® is LTO-6 with a capacity of 2.5 TB and a transfer rate of 160 MB/s, which supports a linear tape file system (LTFS) common to companies and can handle the common file system under a plurality of OS environments, such as a USB memory and an SD card. As shown in FIG. 3, the LTFS is configured such that the area on a tape 17 is divided into two parts, an index partition 18 and a data partition 19, and has meta-information on the file (the attributes, path, physical position, and size of the file, an access control list, extended attributes, etc.) as indices for the data on the tape 17 to be recognized as a file by an OS.

The LTFS reads the meta-information written in the index file on the index partition 18 when the tape 17 is loaded by the magnetic tape drive 15, and after a CPU of the node expands the meta-information on a memory, responds to a request for file system information from the OS. FIG. 4 shows an example of the index file on the index partition 18. As shown in FIG. 4, the index file is managed in a hierarchical structure (directory), and the file of the directory is described in an extensible markup language (xml) format. In this example, the name and size of the file are described in a text format.

The LTFS is a file system that manages files stored in the individual tape media 16 and is provided with an LTFS enterprise edition (EE) extended so as to be used under an environment in which the file system is shared by a plurality of nodes, such as the GPFS. The LTFS EE stores meta-information on the files stored in the tape media 16 in a shared disk 20 shown in FIG. 5, thereby allowing the meta-information to be shared by a node 1 and a node 2. The LTFS EE creates dentries files 21 with the same directory configuration as that of user files of the node 1 and the node 2 in the shared disk 20 and adds file attributes to the dentries files 21 to manage the meta-information.

BRIEF SUMMARY

The GPFS is created so as to manage a large number of large-sized files, such as streaming data, and is not configured to handle small-sized files, such as meta-information.

FIG. 6 shows a diagram comparing the time taken to create dentries files on the shared disk 20 from index files and the time taken to write backed up meta-information on the shared disk 20 as dcache files. Referring to FIG. 6, both the times increases in proportion to the number of files, while the time taken to create dentries files is longer. FIG. 6 shows that it takes about 9 minutes to write twenty thousand dcache files, so that it takes 300 or more days for a billion files. Thus, processing a large number of files, even with a small size, takes considerable time.

Files read by preferred recall at restoration are part of files stored in all the tape media 16. Meta-information that needs to be expanded on the shared disk 20 is only the meta-information of the partial files. Although it takes considerable time to create dentries files of all the files from the index files in all the tape media 16, the time taken to create dentries files of only the partial files can be remarkably reduced.

Thus, a method for collecting files to be read by preferred recall at restoration into a particular tape medium 16 can be used. This is because only a necessary tape medium 16 is loaded, from which index files can be read.

However, with the LTFS EE, since files subjected to a process for the pre-migrated state (premigration) are written not to the individual tape media 16 but to the individual pools each composed of some number of tape media 16, all the files are rarely written to a specific tape medium 16 and are written to the tape media 16 in the pool in a distributed manner. If all the files are distributed in almost all the tape media 16 in the pool, to read the files to be preferred-recalled at restoration, almost all the tape media 16 in the pool have to be loaded, and meta-information of all the files including files other than the files to be preferred-recalled stored in the tape media 16 have to be expanded on the shared disk 2 to execute preferred recall. This has the problem that it takes considerable time to perform the process of expanding meta-information on the shared disk 20.

Accordingly, a method for restoring data in a short time to allow early resumption of operations would be advantageous.

In view of the above problems, a method, computer program product, and system are described for restoring a data processing system. Files on one or more storage devices of a data processing system are backed up to a plurality of magnetic tape recording media. Metadata associated with the backed up files is recorded, including at least magnetic tape identification and magnetic tape location for each backed up file. Files on the one or more storage devices are identified that meet a predefined selection policy for files required for rapid restoration of the data processing system. An index list is generated of the identified files and their associated magnetic tape metadata. The index list is then sorted by magnetic tape identification and magnetic tape location. In response to a request to restore the data processing system to one or more data storage devices, the identified files on the sorted index list are restored in magnetic tape identification and magnetic tape location sort order. Operation of the restored data processing system is then begun in accordance with the restored files.

The present invention advantageously allows restoration of data in a short time, thus allowing early resumption of operations.

BRIEF DESCRIPTION OF THE DRAWINGS

FIG. 4 is a diagram showing an example of index file written to an index partition written to the tape medium shown in FIG. 3.

FIG. 13 is a diagram illustrating access to files in a tape medium.

DETAILED DESCRIPTION

Figure 1:
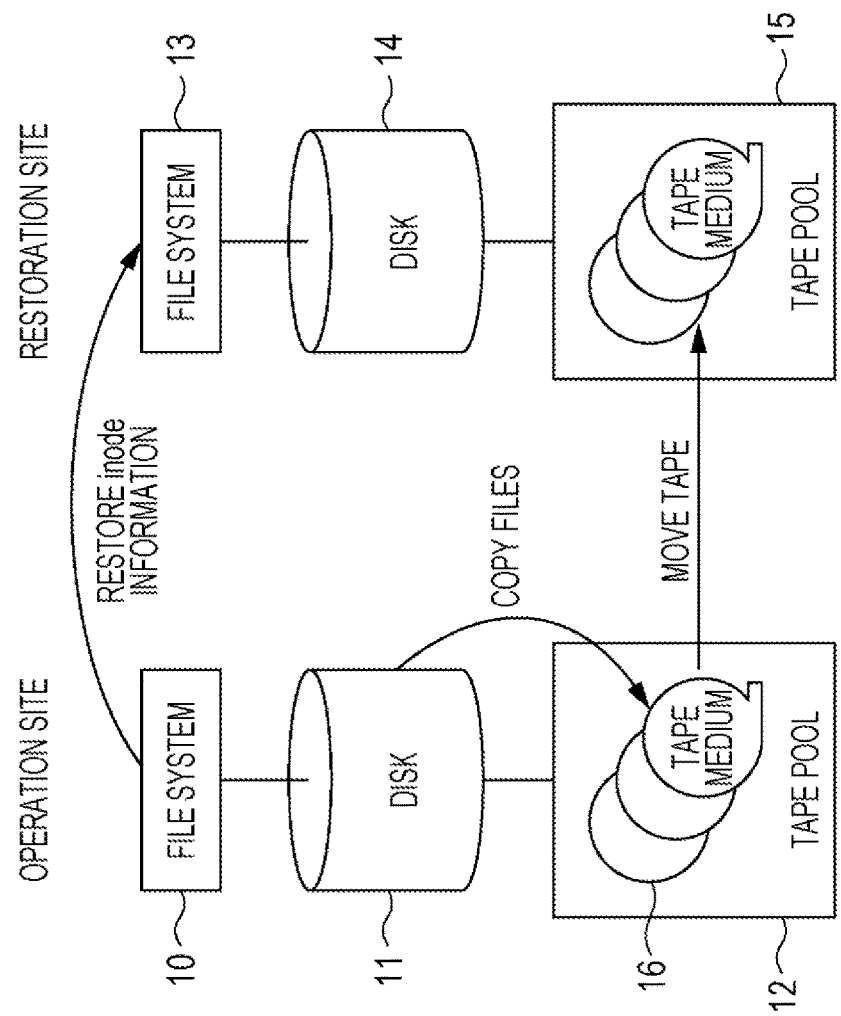
FIG. 1 is a diagram illustrating a method for backing up data and restoring the data.
Figure 2:
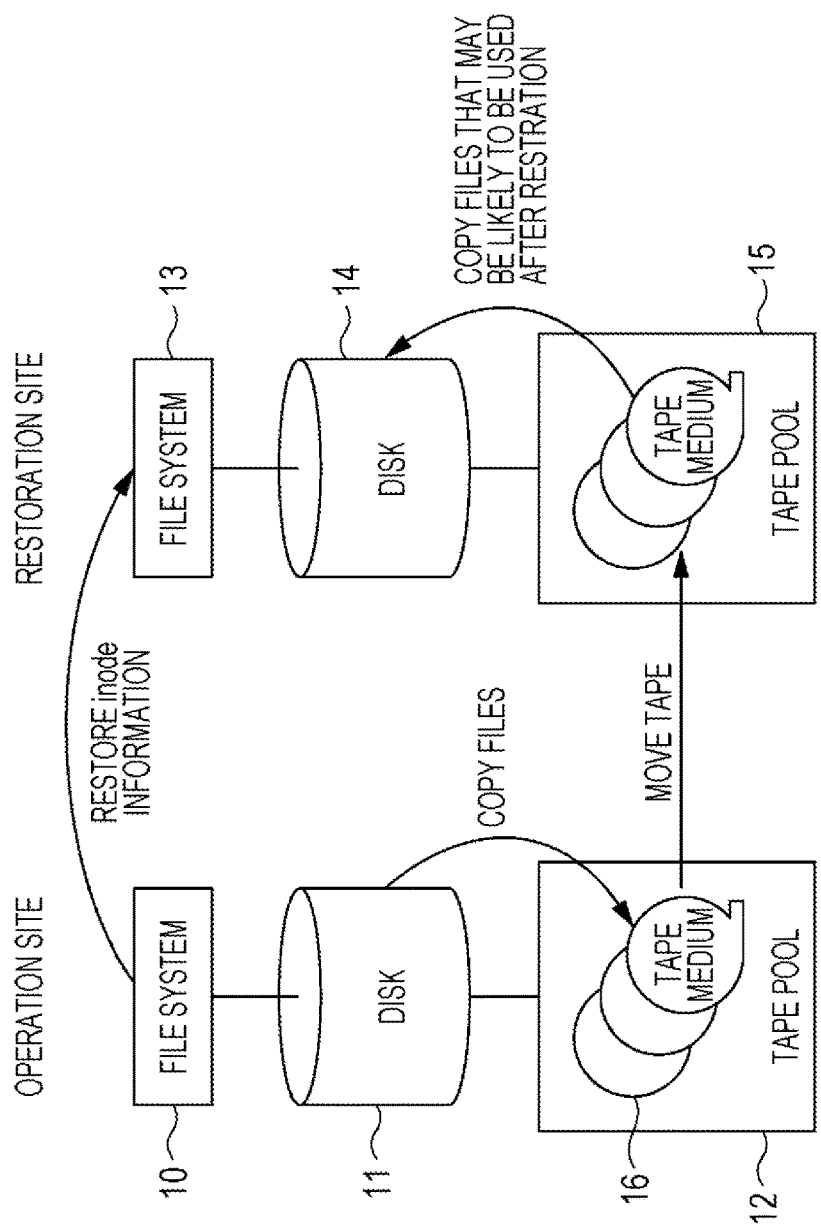
FIG. 2 is a diagram illustrating another method for backing up data and restoring the data.
Figure 3:
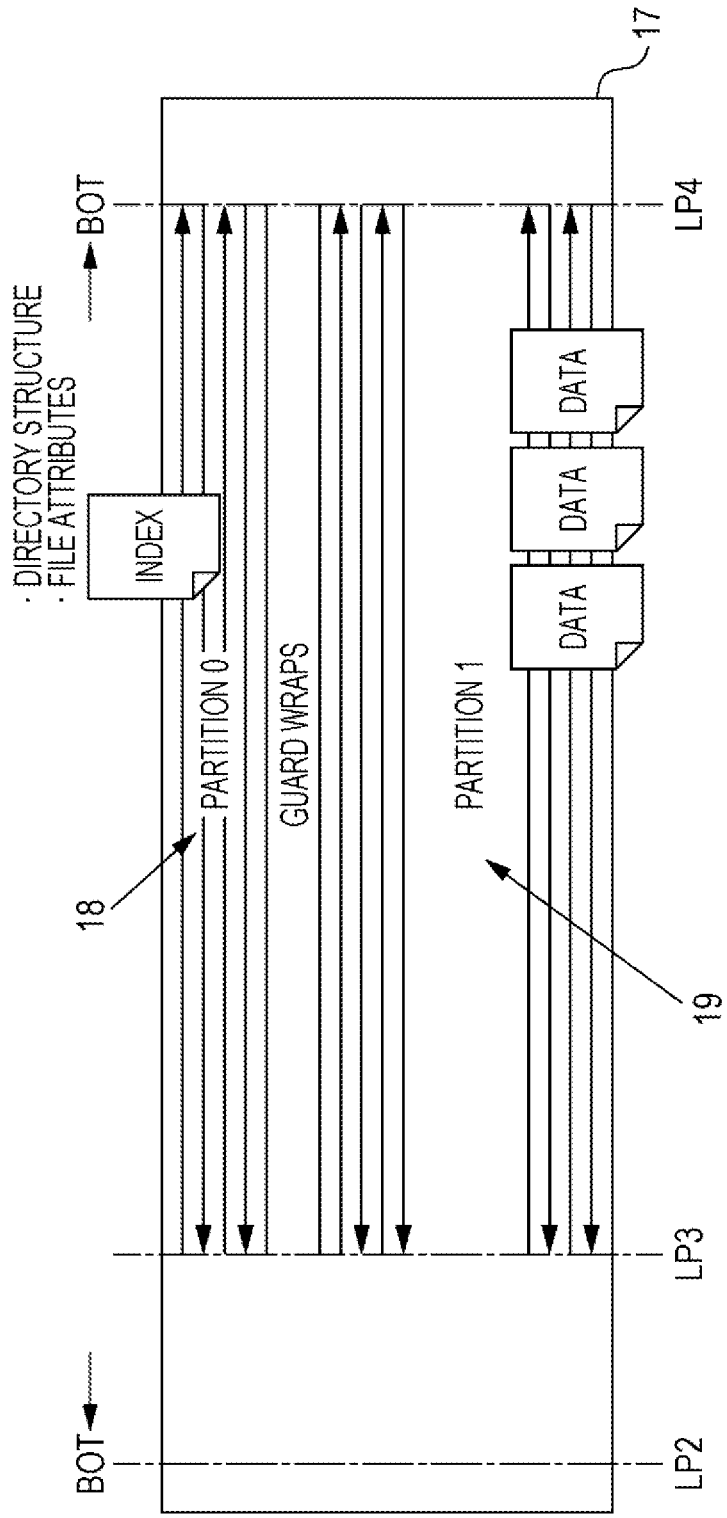
FIG. 3 is a diagram illustrating an example in which tape medium partitioning is used.
Figure 5:
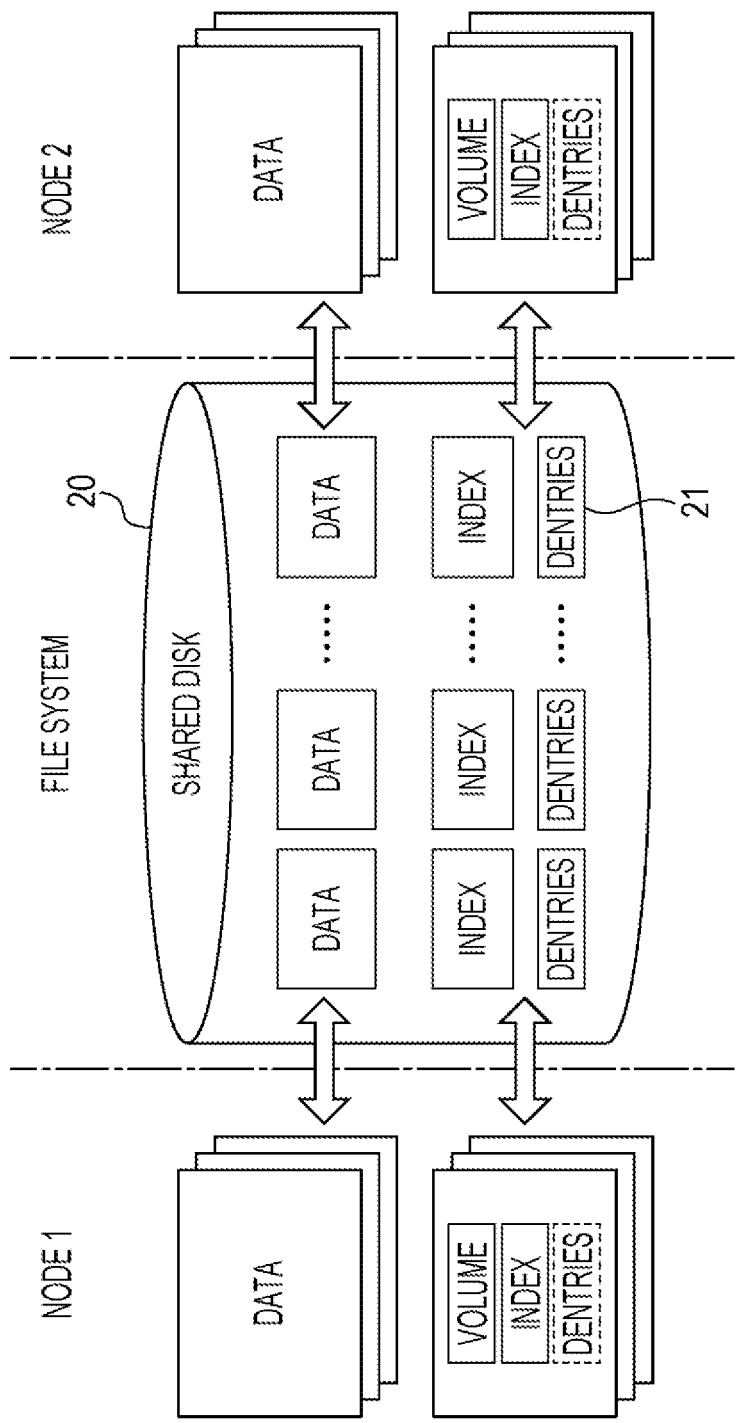
FIG. 5 is a diagram illustrating an example in which a file system is shared by a plurality of nodes.
Figure 6:
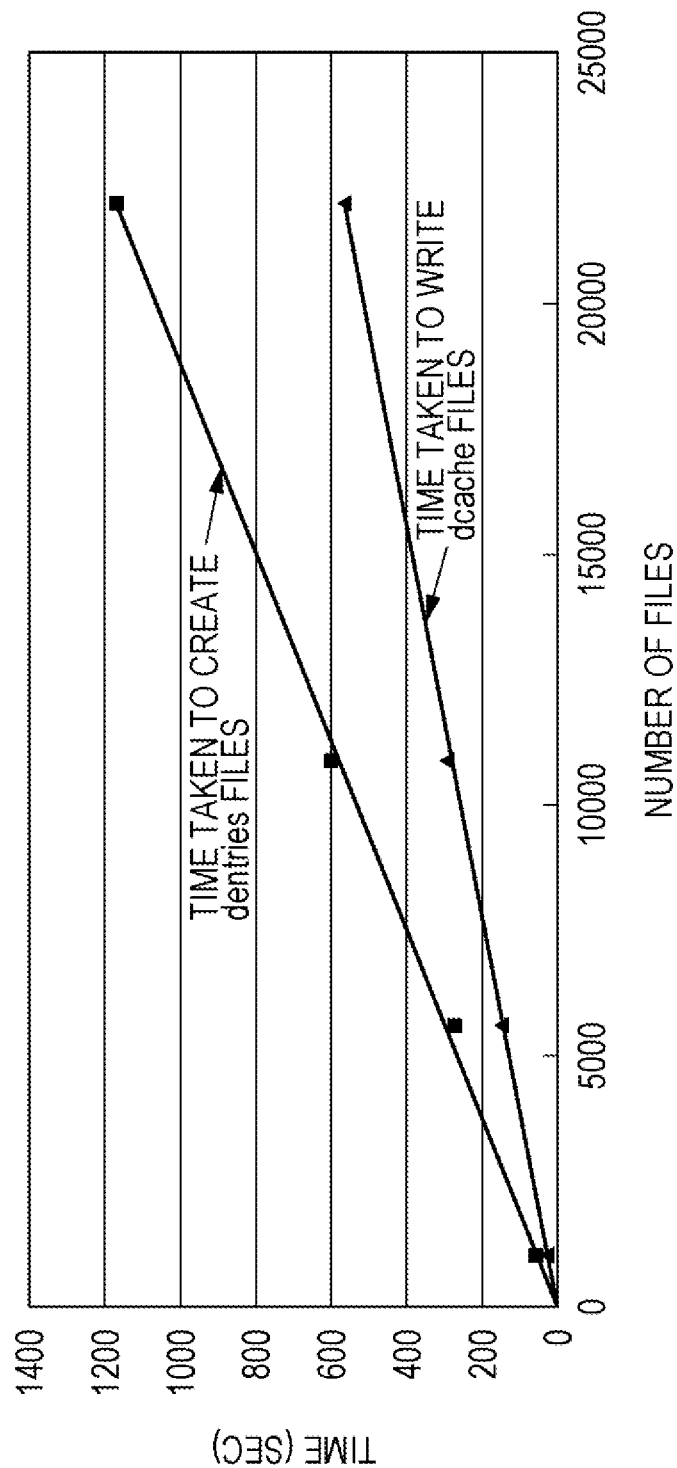
FIG. 6 is a graph showing the relationship between the number of files and thin taken to create dentries files from index files and the time taken to write backed-up dcache files to a shared disk.
Figure 7:
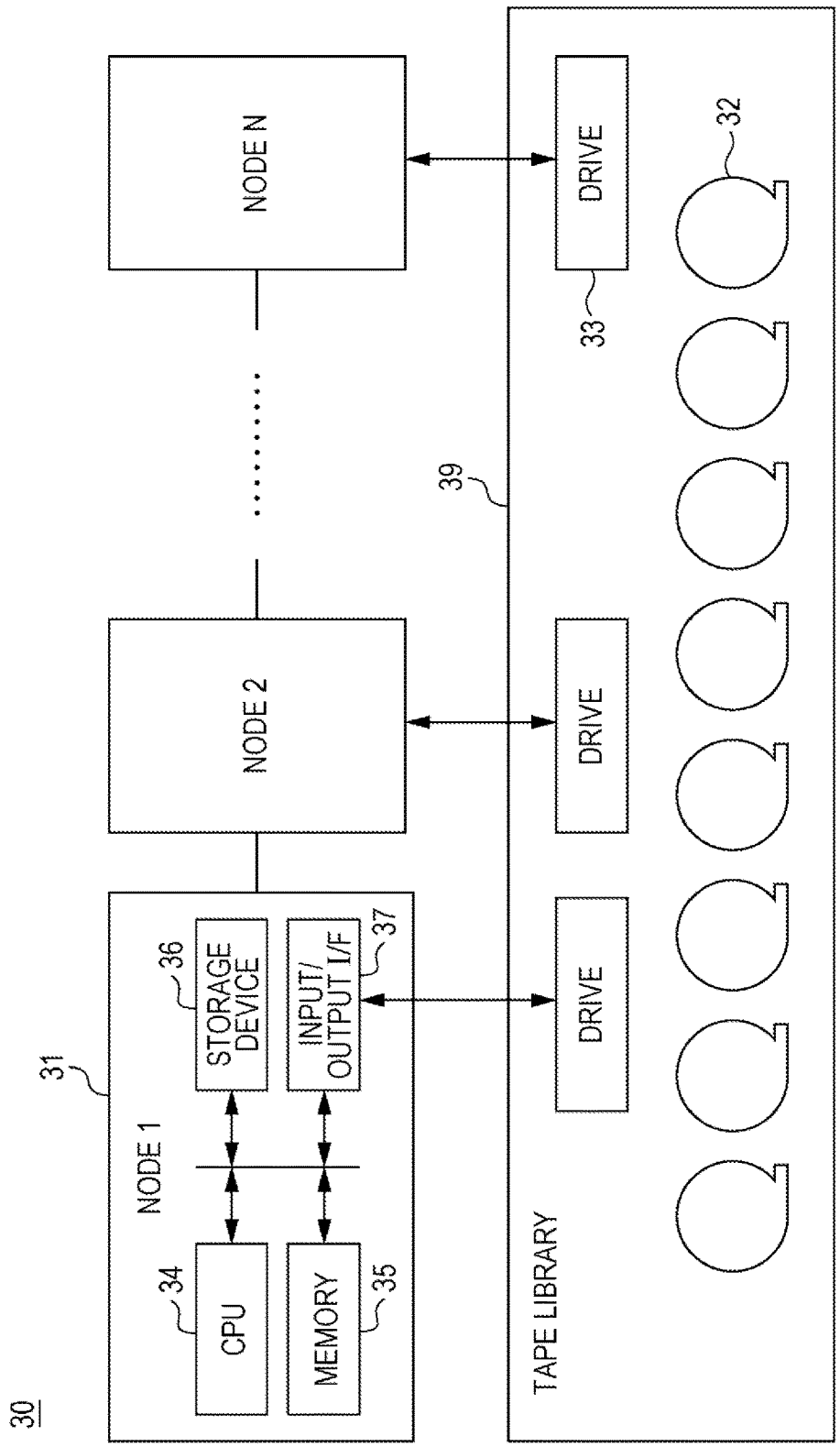
FIG. 7 is a diagram illustrating a configuration example of a data processing system for backing up or restoring a plurality of pieces of data.

Although the present invention will now be described based on a specific embodiment shown in the drawings, the present invention is not limited thereto. FIG. 7 is a diagram showing an example configuration of a data processing system for backing up a plurality of pieces of data or restoring them. The data processing system 30 is built, with the same configuration, in an operation site for performing such operations as distribution of content and images and a restoration site for restoring the operations in a remote location from the operation site. The data processing system 30 of the operation site holds a plurality of pieces of data and is used to write the plurality of pieces of data to a plurality of recording media for backup, and the data processing system 30 of the restoration site is used to restore the backed-up plurality of pieces of data.

The data processing system 30 includes a plurality of N nodes 31 and a plurality of drives 33 capable of loading a plurality of tape media 32. The plurality of nodes 31 may be computers, for example, N server units, which are connected to each other and are connected to the individual drives 33. The data processing system 30 is configured as a cluster system in which the nodes may decentrally execute parallel processing. Although FIG. 7 shows a cluster system, the present invention is not limited thereto and may be a system constituted, for example, by one server unit and one drive.

The nodes 31 each include a CPU 34 serving as a processing unit, a memory 35, such as a RAM, a storage device 36, such as a HDD, and an input/output interface (I/F) 37. The CPU 34 may execute predetermined processes on data as files. The predetermined processes may include reading, writing, and processing files. The reading and writing of files includes backing up data and restoring data. The memory 35 provides a storage area for storing files that the CPU 34 reads to perform processes. Thus, the CPU 34 reads a file on the memory 35 and then processes the read file.

The storage device 36 can store a program for causing the CPU 34 to execute a predetermined process as well as backup data or restore data as a file. The storage device 36 can be configured such that part of its storage area that the node can access serves as a shared disk. The shared disks provided in the plurality of nodes 31 may be connected over a network to form a network shared disk (NSD). The storage device 36 is not limited to the HDD and may be an SSD etc.

Files that the storage device 36 can store may include a document file, an image file, a video file, and any other files. The files include attribute information (meta-information) as information of the files. The storage device 36 can store various predetermined values, an OS, and a driver in addition to the program and the files. The OS may be a UNIX® OS, a LINUX® OS, a Windows® OS, or a Mac OS®, which performs management of an input/output device, the memory 35, and the storage device 36, control of communication over a network, and so on. The driver controls and operates devices in the node 31 and devices connected to the node 31.

The input/output I/F 37 connects the node 31 to the drive 33 to send and receive files to/from the drive 33. The nodes 31 may each further include a ROM that stores a boot program for starting the drive 33, an external storage I/F for connecting an external storage medium, a communication I/F for connecting to a network, a user I/F that receives input from the user, and a display for displaying a processing state, an error, etc.

Examples of the recording medium may include a USB memory, an SD card, a CD-ROM, and a tape medium 32. In an exemplary embodiment, the recording medium will be described below as a tape medium 32. The tape medium 32 is a tape that is multiply wound around a reel and is accommodated in a cartridge. The drive 33 has an insertion port into which the cartridge is inserted. By inserting the cartridge into the insertion port, the tape medium 32 can be set. The drive 33 reads and writes a file from/to the tape medium 32 set in the drive 33 on the basis of a command from the CPU 34. Management and operation of the plurality of tape media 32, insertion of the tape media 32 into the drives 33, and so on are performed by a tape library 39. Thus, the plurality of drives 33 are built in the tape library 39.

The drives 33 may each include, for example, an input/output I/F connected to the input/output I/F 37 to receive a command to read or write a file from/to the tape medium 32 issued from the OS of the node 31, a memory that stores files to be written and read files, a head for actually reading and writing a file from/to the tape medium 32, a drive unit that rotates the reel at a given rotational speed, and a controller that controls the entire drive 33.

Figure 8:
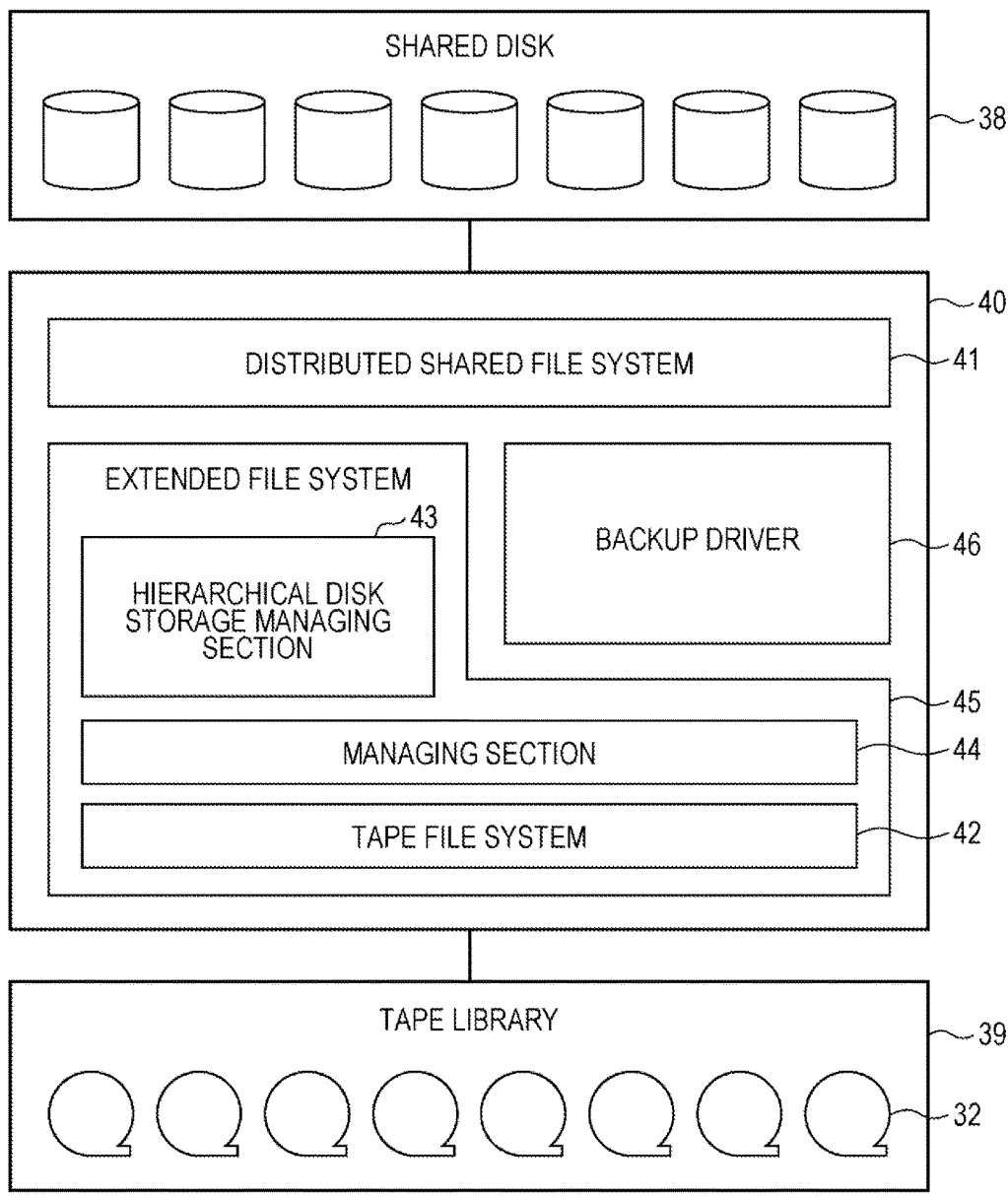
FIG. 8 is a diagram illustrating an example of components constituting a program implemented in the data processing system shown in FIG. 7.

FIG. 8 is a diagram showing an example of components of a program included in the data processing system 30. The data processing system 30 may include a shared disk 38, such as an NSD, composed of a plurality of disks shared by the plurality of nodes 31, the tape library 39 including the plurality of tape media 32 and the drives 33, and a management system 40 composed of a plurality of components used by the plurality of nodes 31, for managing the shared disk 38 and a plurality of files in the tape library 39.

The components may include a distributed shared file system 41, such as a GPFS, for managing files shared by the plurality of nodes 31, such as those stored in the shared disk 38, and a tape file system 42, such as a LTFS, for managing files stored in the individual tape media 32. The systems 41 and 42 manage meta-information on the files together with the files. The distributed shared file system 41 allows access to shared files, and the tape file system 42 allows access to files stored in the individual tape media 32.

The components further include, in addition to the tape file system 42, a hierarchical disk storage managing section 43 and a managing section 44, thus providing a tape file system (an extended file system) 45 with an extended function allowing files in the tape media 32 to be shared by the plurality of nodes 31. The hierarchical disk storage managing section 43 builds a hierarchical disk structure in which the shared disk 38 is in an upper layer, and the tape library 39 is in a lower layer and moves the files from the upper layer to the lower layer. The managing section 44 determines which tape medium 32 in the tape library 39 is used to store each file for sorting. The managing section 44 reads files from the tape media 32 and writes the read files to the shared disk 38. Another example of the components is a backup driver 46 for backup.

The tape library 39 uses the plurality of tape media 32 divided into an archive tape pool and a backup tape pool. The archive tape pool is mainly used for two purposes. One purpose is to copy important files stored in the shared disk 38 and redundantly store the copies in the tape media 32. The other purpose is archiving in which files that have not been used for a period of time are written to the tape media 32 and deleted from the shared disk 38 on the basis of a migration policy. The migration policy may be, for example, files that have not been used for 30 days are moved to the tape media 32.

The backup tape pool is used for backup for resuming operations in a remote restoration site. Writing of files to the tape media 32 in the backup tape pool is also performed on the basis of the migration policy.

The files that the data processing system 30 handles may include, in addition to the user files, meta-information, such as the name, path, physical position, size, access control list, and extended attributes of the file, and so on. Thus, the data processing system 30 shares meta-information among the nodes 31, in addition to the user files. The path included in the meta-information describes a route from the highest layer of the directory (a route directory) to a target file. The access control list is control information that describes whether to permit access to the file. The extended attributes are information that can be added and described by the user.

In normal operations using the data processing system 30, files written to the shared disk 38 serving as a high-speed storage are written to the tape media 32 in the backup tape pool serving as a low-speed storage on the basis of the user-defined migration policy. When files are written, the files are not deleted from the shared disk 38. Thus, the files are present in three locations, that is, the shared disk 38 and the tape media 32 (a pre-migrated state).

In the environment having the archive tape pool, files copied from the shared disk 38 to the archive tape pool can be deleted from the shared disk 38 to provide free space in the shared disk 38 to make effective use of the shared disk 38. This allows a migrated state in which files are present only in the archive tape pool to be supported.

The shared disk 38 stores, in addition to the entity of data constituting the file, inode information having meta-information on the file as management information for managing the file. The distributed shared file system 41 manages the inode information, obtains directory information and meta-information on a target file, as file system information, from the inode information, and causes the OS to recognize the file in response to a request for file system information from the OS. Since the file system information includes a path, a physical position, etc., the nodes 31 can access the file to read the file.

The distributed shared file system 41 includes an inode backup component, with which the inode information can be backed up.

The tape file system 42 manages files in the tape media 32 using index files in which meta-information on the files are indices. In an embodiment, the tape file system 42 has the drives 33 connected to the individual nodes 31. When a file is copied from the shared disk 38 to the tape medium 32, the file is copied, on a node 31 that executes copying, from the distributed shared file system 41 to the tape file system 42. At the same time, the meta-information in the tape file system 42 is written to the distributed shared file system 41. Since the meta-information written to the distributed shared file system 41 can be referred to from the other nodes 31, the tape file system 42 seems to be shared by the plurality of nodes 31.

The extended file system 45 reads the meta-information in the index files that the tape file system 42 manages from the tape medium 32 when the tape medium 32 is loaded, and expands the meta-information in a memory in response to a request for file system information from the OS. Thus, the file in the tape medium 32 is recognized by the OS using the file system information. This allows the node 31 to read the requested file from the tape medium 32 under the control of the OS without using a particular program.

The inode information includes extended attributes. The extended attributes include medium identification information for identifying the tape medium 32 in which the entity of the file is stored, that is, a tape ID or tape identifying information. The extended file system 45 determines from which tape medium 32 the file is to be read, on the basis of the information of the tape ID written in the inode information. This allows the specified tape medium 32 to be mounted, from which the file can be read.

The backup driver 46 receives a backup request, takes a snapshot of the distributed shared file system 41 when the request is received, and scans the file system that the snapshot indicates. Here, scanning means scanning all the attributes of all files in the file system. During the scanning, when a file conforming to the user-defined selection policy is detected, the path name of the file is added to the file list. Since the selection policy can be designated when a backup request is received, data to be read at restoration can be designated with flexibility, for example, preferred recall is executed on files written within 48 hours before backup.

The selection policy can be set to select, for example, files that may be used soon after operations are resumed. Other examples of the selection policy include a rule for selecting files stored within one week or selecting a certain type of files. The selection policy can be set depending on users' operations. The backup driver 46 creates a list of selected files and creates index files for preferred recall on the basis of the list.

Figure 9:
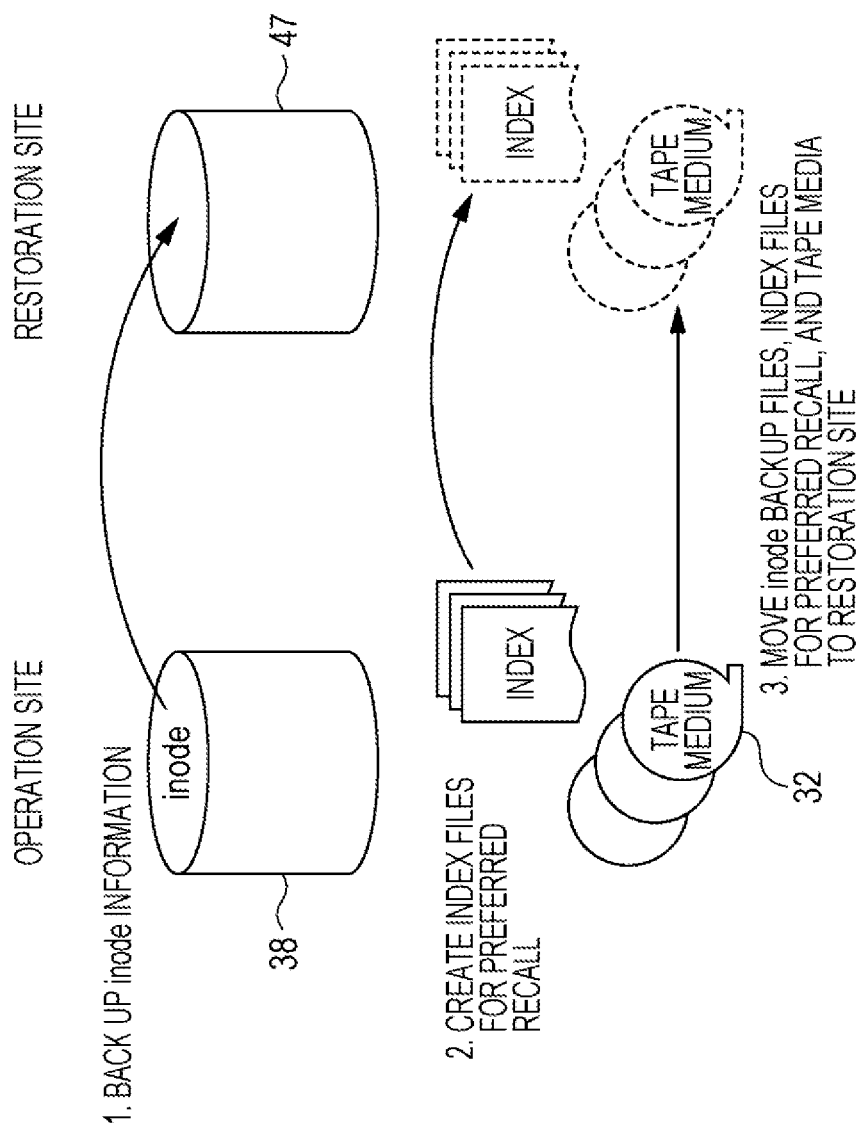
FIG. 9 is a diagram illustrating the process of backing up data performed by the data processing system.

Referring to FIG. 9, backups that the data processing system 30 performs will be described. The backup is implemented in accordance with a preset schedule or a user's instruction by the data processing system 30 in the operation site. First, the data processing system 30 scans a file system that manages backup files using the backup driver 46. The file system is scanned to detect all files that the file system manages. The file system may be a distributed shared file system 41, which is one of the components in FIG. 8.

The data processing system 30 determines files to be backed up. The backup files are files that have already been shifted to the migrated state or the pre-migrated state when a backup request is received.

Upon scanning, the data processing system 30 selects files, on the basis of the selection policy, that are to be first read by the data processing system in the restoration site with the same configuration as that of the operation site and to be brought into the pre-migrated state, that is, files that may be quickly used in the restoration site, and creates a list of the selected files (a preferred recall list).

During the creation of the preferred recall list, it is preferable to sort the files by the tape IDs of the tape media 32 in which the files are stored, because this can improve the reading performance at the restoration. It is more preferable to sort the files by block information (block numbers) indicating the positions of the files in the tape media 32. This is because reading the files in order of block numbers can minimize the time taken to locate the beginning of the files. The preferred recall list may be a single list, which is grouped by tape IDs, or lists for individual tape IDs. The sorting may be performed by the backup driver 46.

Next, as shown at (1), all inode information is backed up by the inode backup component of the file system. The backup destination may be either the tape media 32 or another recording medium, such as a USB memory. The backup destination is not limited to the recording media; files may be directly transmitted to the restoration site over a network and may be backed up in a shared disk 47 in the restoration site.

As shown at (2), after the inode information is backed up, the index information on the files listed in the created preferred recall list is extracted from the index files in the shared disk 38.

Preferred-recall index files are created using the extracted index information. The preferred-recall index files can be created, for example, by deleting the tags of files that are not present in the preferred recall list of index files in the shared disk 38.

The preferred-recall index files include the path names of the files to be preferred-recalled, and the index file names can include a tape ID. This allows determination in which tape medium 32 the index information is to be backed up. These preferred-recall index files can also be backed up in recording media, or can be directly transmitted to the restoration site over a network, as well as the inode information, and can be backed up in the shared disk 47 in the restoration site.

Since the data processing system at the backup side is the data processing system 30, the shared disk 38 and the shared disk 47 are shown as distinguished from each other.

As shown at (3), after the preferred-recall index files are created, all the tape media 32 in which all the backed up files are stored, inode backup files, which are inode information, and preferred-recall index files are moved to the restoration site. In the restoration site, the files are restored using them. If the files are backed up in the recording media, the recording media that store the inode information and the preferred-recall index files are moved to the restoration site and restored in the shared disk 47 in the restoration site.

Figure 10:
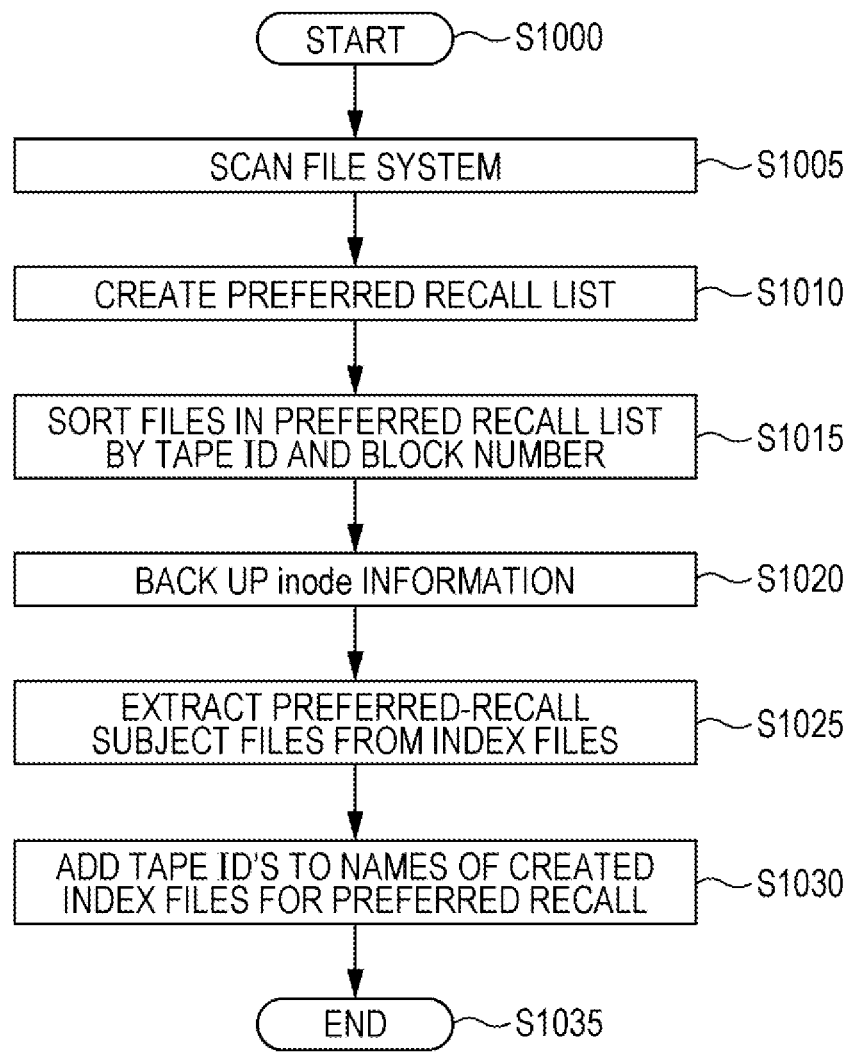
FIG. 10 is a flowchart showing the process shown in FIG. 9.

The flowchart of the backup process will be described in detail with reference to FIG. 10. The backup is started from step 1000 by receiving a backup request issued in accordance with a user's instruction or by receiving a backup request issued in accordance with a schedule. In normal operations, the data processing system 30 reads and writes data from/to the nodes 31 to update the files. Thus, the content of the file system changes all the time. Thus, the snapshot of the file system is first taken to determine backup files.

At step 1005, the file system whose snapshot was taken is scanned to determine backup files. During the scanning of the file system, the attributes of files in the snapshot are compared, and files in either the migrated state or the pre-migrated state are determined to be files to be backed up.

At step 1010, files to be read from the tape media 32 and brought into the pre-migrated state in the restoration site are determined, simultaneously with the scanning at step 1005, on the basis of the selection policy, and the determined files are listed to create a preferred recall list.

At step 1015, the files in the preferred recall list are sorted by the tape IDs of the tape media 32 in which the files are stored. That is, the files are grouped by tape IDs. Furthermore, the files are sorted also by block numbers indicating the positions of the files in each of the tape media 32. That is, the files are sorted by block numbers. Thus, grouping the files by tape IDs and sorting the files by block numbers can increase the file reading speed and enhance the performance.

At step 1020, the inode information is backed up using the inode backup component of the file system. The backup can be performed either by storing the backup files of the inode information in a recording medium or by directly transmitting the files to the restoration site over a network and storing the files in the shared disk 47 in the restoration site. In the case where files are backed up in a recording medium, the recording medium is carried to the restoration site, where the files can be restored in the shared disk 47.

The entity of data is used by carrying the tape media 32 in the backup tape pool created in normal operations to the restoration site.

At step 1025, information on the files in the preferred recall list is extracted from index files shared in the shared disk 38 among the nodes. At step 1030, preferred-recall index files are created from the extracted file information. The preferred-recall index files are created for all tape media 32 in which backup files are stored.

The index files shared among the nodes may be xml-format files, in which information on the files is described, and the description also includes information on files not included in the list. At step 1030, only information on the target files may be extracted and created from the index files shared among the nodes, or alternatively, information on files that are not target files may be deleted for creation. In the case where meta-information expanded in the memory is present, i.e., dentry information is present, an index file that lists the files to be preferred-recalled may be newly created.

At step 1030, a tape ID is added to the file name of each created index files. This facilitates associating the index file with a tape medium 32 in which the corresponding file is stored in the restoration site. Although the index files and the tape media 32 are associated with each other using file names, the present invention is not limited thereto; they may be associated using another method.

After completion of the association of the index files and the tape media 32, the process goes to step 1035 to terminate the backup. For restoration, the inode information backed up at step 1020, the index files for preferred recall created at step 1025, and all the tape media 32 in the backup tape pool are moved to the restoration site.

Figure 11:
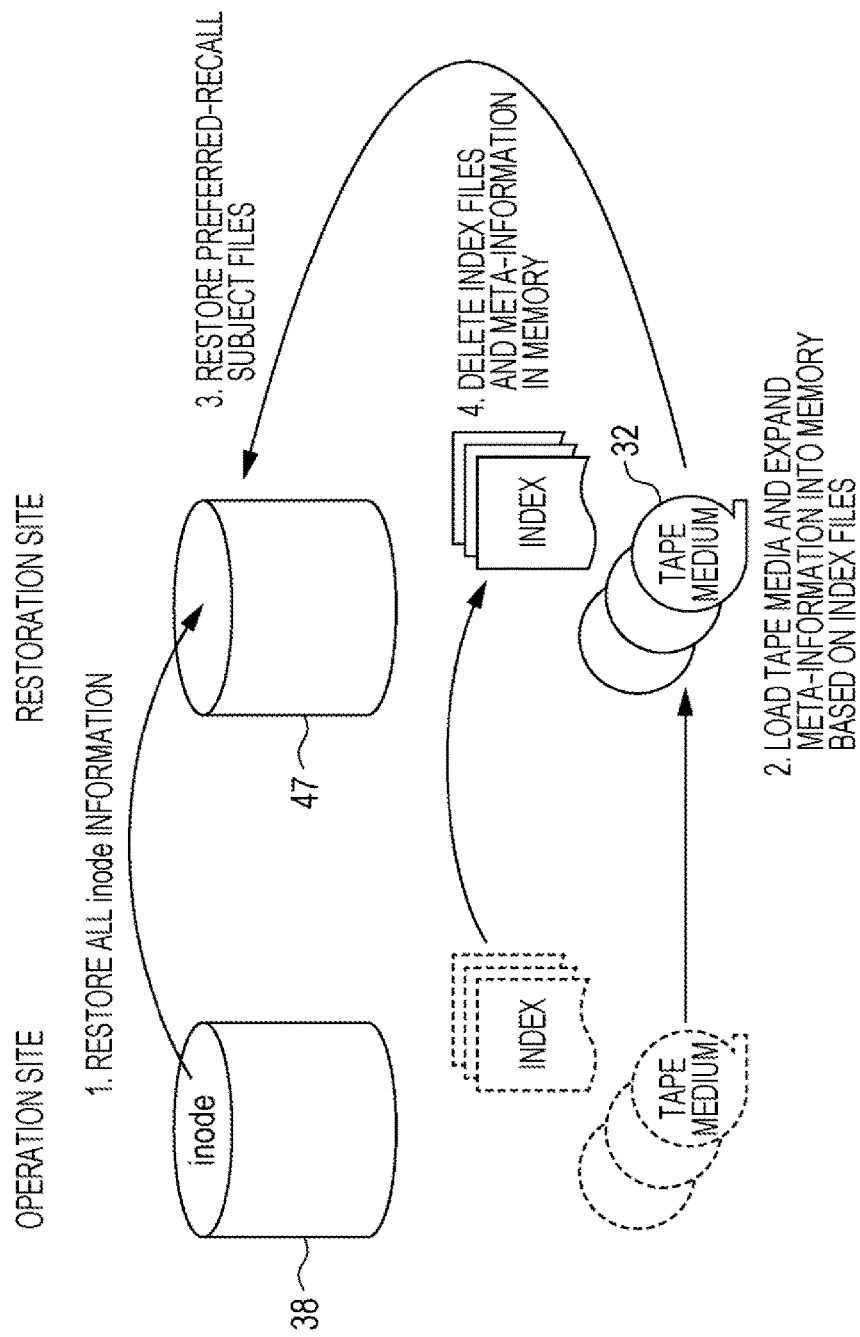
FIG. 11 is a diagram illustrating the process of restoring data performed by the data processing system.

Next, restoration at the restoration site will be described with reference to FIG. 11. The restoration site is provided with the data processing system 30 as a cluster system comprising a plurality of nodes, like the operation site of the backed up operations. Thus, the data processing system 30 in the restoration site includes the shared disk 47 that can be read and written from/to the plurality of nodes, the tape library 39, and the management system 40. The tape library 39 includes at least an archive tape pool, and as needed, a backup tape pool. All the tape media 32 in the backup tape pool of the operation site are set in the tape library 39.

As shown at (1), in the restoration site, first the backup files of the inode information obtained in the operation site are stored in the shared disk 47, and the inode information is restored. Next, as shown at (2), the tape media 32 are loaded in the drives 33. Meta-information on files to be preferred-recalled is expanded in a memory using the created preferred-recall index files. At this time, of the files in the preferred recall list, files in the tape media 32 are recognizes as files on tape volume. In contrast, files not present in the preferred recall list are not recognized by the file system. This is because meta-information on these files is not expanded in the memory.

The files stored in the tape media 32 set in the tape library 39 are grouped by tape IDs in the preferred recall list and listed in order of block numbers. Since the tape IDs are included in the file names of the preferred-recall index files, the tape IDs can be obtained from the file names.

Next, as shown at (3), the tape media 32 are identified by the obtained tape IDs, and the files are checked in sequence from the head of the identified tape media 32 on the basis of the preferred-recall index files to read appropriate files. By reading the files, the tape medium 32 is loaded. When the relevant files in the migrated state are read from the tape medium 32 by the managing section 44 of the extended file system 45, the files are written into the shared disk 47 by the managing section 44 into a pre-migrated state. In this process, on completion of reading files with one tape ID in the preferred-recall index files, files with the next tape ID are read. This process is repeated until files for the last tape ID are completed. In the case where a plurality of drives 33 are available, parallel reading by tape ID can be performed, thus allowing high-speed processing.

As shown at (4), the preferred-recall index files are deleted because they become unnecessary when all the files to be preferred-recalled are read on the shared disk 47. The meta-information expanded in the memory is also deleted.

The tape file system 42 may be mounted to expand meta-information on the files to be preferred-recalled in the memory, and after the files are read into the shared disk 47, the tape file system 42 is unmounted once and is again mounted. Since the preferred-recall index files and the meta-information expanded in the memory are overwritten by the unmounting and the second mounting, no additional operation for deleting them is required.

Figure 12:
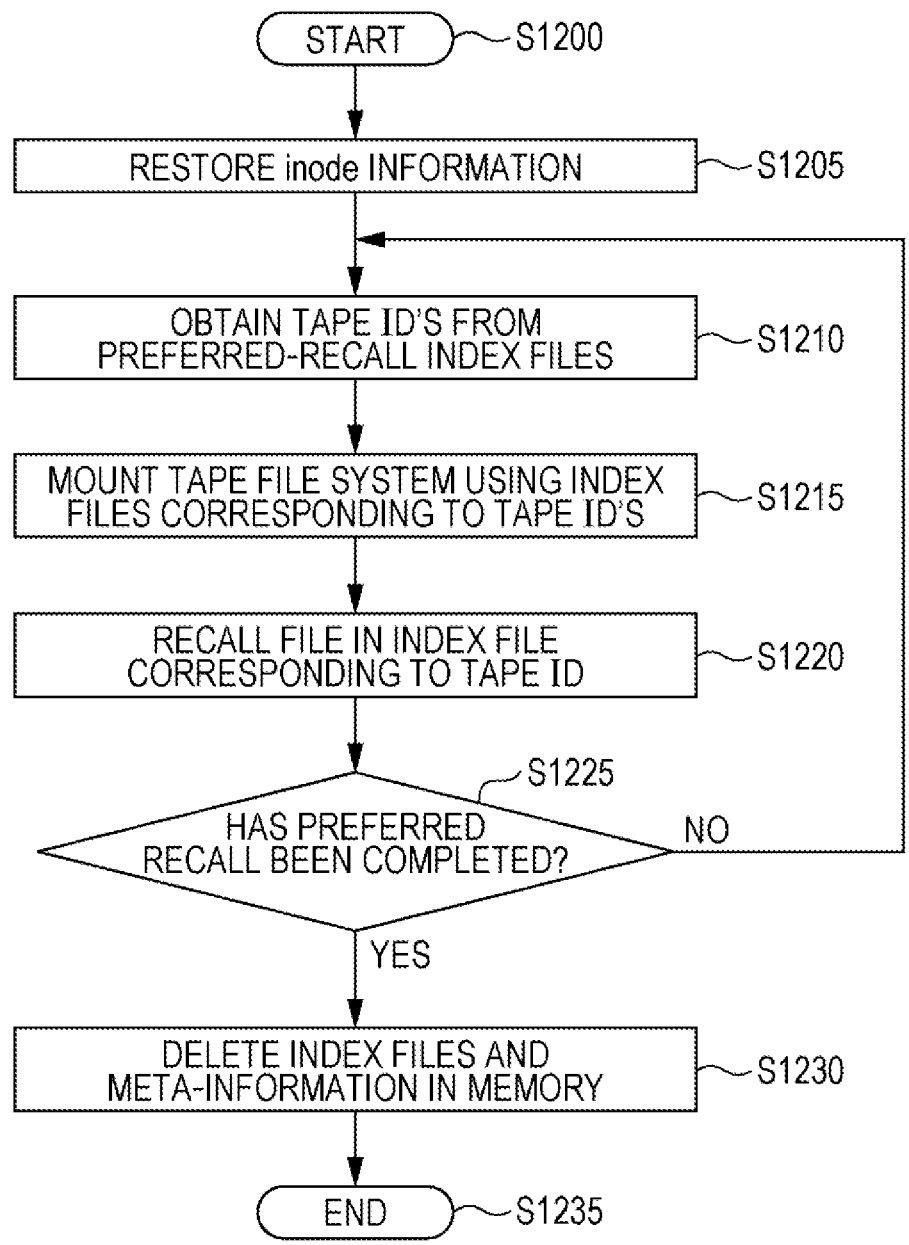
FIG. 12 is a flowchart showing the process shown in FIG. 11.

The restoring processing flow will be described in detail with reference to FIG. 12. In the restoration site, the data processing system 30 equivalent to that of the operation site is constructed in advance, as described above. A file system (distributed shared file system 42) is created in advance in the shared disk 47 shared among the nodes. Furthermore, the tape file system 42 is created locally from the nodes. Although the restoration site absolutely requires the shared disk 47 and the archive tape pool, the backup tape pool is optional.

The process is started from step 1200. At step 1205, backup files including inode information backed up using the backup component in the operation site are stored in the shared disk 47, and the inode information is restored using a restore component incorporated in the file system. By restoring the inode information, the files in the file system are restored in a migrated state. That is, the entities of the files are restored in a state in which they are present only in the tape media 32.

The tape media 32 in the backup tape pool of the operation site are set in the tape library 39 of the restoration site. This causes the data processing system 30 to accept connection of the tape media 32. At this time, operations are not resumed. This is because the files to be preferred-recalled have not yet been read in the shared disk 47. If operations are resumed at this point in time, and files in the file system are accessed, the files are read from the tape media 32 with tape IDs written in the inode information.

The preferred-recall index files are copied to the shared disk 47. When preferred recall is performed from only one node 1, there is no need to copy the files to the shared disk 47; however, when parallel processing among a plurality of nodes is performed to distribute workloads, the files need to be copied to the shared disk 47. At step 1210, tape IDs are obtained from the file names of the preferred-recall index files.

At step 1215, the tape file system 42 that manages files that the tape media 32 with the obtained tape IDs store is mounted. At that time, an option is designated. Normally, when the tape file system 42 loads a tape medium 32, the tape file system 42 reads index files copied to the shared disk 47 and index files in the tape medium 32 to construct dentry files on a memory. If they do not match, the index files in the tape medium 32 are given priority in use. This causes the dentry files of all files in the tape medium 32 to be created using the index files in the tape medium 32.

Thus, optionally, the tape file system 42 is switched from a setting for mounting using the index files in the tape media 32 to a setting for mounting using the copied index files. This allows dentry files to be formed in the memory not using the index files in the tape media 32 but the index files copied to the shared disk 47. Thus, among the files to be preferred-recalled, only dentry files of files stored in tape media 32 with the tape IDs are formed in the memory.

The tape file system 42 has an option of being mounted without forming dcache files in the shared disk 47. Although normal operations require to share a dcache file among the nodes when reading a file, preferred recall does not require to share a dcache file among the nodes. Thus, this option is designated in mounting the tape file system 42. This allows only necessary dentry files to be created and no dcache file to be formed.

At step 1220, the extended file system 45 of the management system 40 is started to expand meta-information of files stored in a tape medium 32 with the tape ID among files to be preferred-recalled, that is, dentry information, into the memory and to read the files from the tape medium 32, thereby writing the files to the shared disk 47. Thus, the files are recalled into a pre-migrated state. At that time, the files can be read at high speed by determining the order of reading in consideration of information on the position of the files in the tape medium 32, which the extended file system 45 has as an extended attribute in the meta-information.

The files are sorted by grouped tape IDs in the preferred-recall index files. At step 1225, the extended file system 45 determines whether preferred recall has been completed on all tape IDs. If the preferred recall has not been completed, the process returns to step 1210, at which preferred recall on a tape medium 32 with the next tape ID is executed. In the case where preferred recall is performed from the plurality of nodes 31, the files may be divided by grouped tape IDs, and the preferred recall may be performed in parallel on each tape ID in the individual nodes 31. The parallel processing allows restoration in a shorter time, thus allowing operations to be early resumed.

Access to files in the migrated state will now be described with reference to FIG. 13. In the case where the GPFS is used as a file system, files in the file system are described in layers under a directory, "/gpfs". In the case where the LTFS is used as the tape file system 42, a directory "/ltfs", in which the tape library 39 is created, is mounted as a mount point, and files on a tape with a tape ID are listed below a directory with the tape ID.

Only inode information on a file in the migrated state is present in the GPFS in an upper layer, and the entity of the file is present on a tape. When the file is accessed, only the entity of the file on the tape, which is written in the attributes in the inode information, is read and copied to the file system of the GPFS into the pre-migrated state.

Assume that the user accesses a GPFS file "/gpfs/dir1/file3". Then, the data processing system 30 obtains, in the preferred-recall index file, a tape ID from a file name. If the tape ID is "tapeA", "/ltfs/tapeA/dir1/file3" of a tape medium 32 with "tapeA" is accessed. In the example shown in FIG. 13, this file has an alias symbolic link, reading is performed from a file in the folder of tapeA, ".LTFSEE_DATA", in which the entity of the file is present.

Referring again to FIG. 12, if it is determined at step 1225 that preferred recall has been completed, the process goes to step 1230, at which the extended file system 45 is stopped, and the tape file system 42 is unmounted. This unmounting causes the meta-information expanded from the index file into the memory to be deleted.

The tape file system 42 is mounted without designating the option of mounting without forming dcache files, and the extended file system 45 is started, and the restoration is completed at step 1235. That is, the tape file system 42 is switched to a setting for mounting using index files in the tape media 32. When a file that is not preferred recalled is accessed after the tape file system 42 is mounted, meta-information on the file is expanded in the memory from the index file in a tape medium 32 in which the file is stored. Since a dcache file is constructed in the shared disk 47, access to the file is allowed. When the file becomes accessible, normal operations can be resumed.

After the restoration, both files to be preferred-recalled and files not to be preferred-recalled can be read. The files to be preferred-recalled have already been present in the shared disk 47 and are in the pre-migrated state, the files can be read from the shared disk 47.

The files not to be preferred-recalled are once read from the tape media 32 into the shared disk 47, are written to the shared disk 47, and are read from the shared disk 47. The tape ID of a tape medium 32 in which the file is stored is written in the extended attributes in the inode information. The extended file system 45 reads files from the tape medium 32 with the tape ID. At this time, meta-information has not yet been expanded on the memory. Thus, the tape medium 32 is mounted, meta-information is read from the index partition of the tape medium 32 and is expanded in the memory, and at the same time, an index file is formed on the shared disk 47.

When a file is accessed from the node 31, the tape medium 32 is loaded, and the tape file system 42 reads the index information on the tape and is mounted. Thus, at the time of backup, there is no need to back up the entire index.

The accessed file is read from the tape medium 32 and is stored in the shared disk 47. The state of the file is changed to the pre-migrated state. When writing to the file is performed, the state of the file transits to a resident state. The resident state is a state in which the file on the drive 33 is deleted, and the entity of the file is present only in the shared disk 47.

At the backup, although the index of the files to be preferred-recalled is stored, the present invention is not limited thereto; dentry information may be stored. An actual simulation and verification shows that restoring using an index file allows early restoration. Thus, it is preferable to store the preferred-recall index file.

As has been described above, the method for restoring data, the data processing system, and the program for causing the data processing system to execute the method according to the present invention eliminate the need for expanding meta-information on files other than files that may be used soon after restoration in a memory, thus reducing the time corresponding thereto. This also eliminates the need for creating dcache files in a shared disk, thus reducing the time corresponding thereto. This can reduce the time taken to resume operations in the restoration site.

In a specific example, it is known that the time taken to build dcache files in the shared disk 47 is ten or more times as long as the time to expand meta-information in the memory. For example, when a tape medium 32 in which one million files are stored is mounted, it takes several hours to build dcache files in the shared disk 47, while the time taken to expand meta-information in a memory is as short as about 10 minutes. Since the present invention does not need to build dcache files in the shared disk 47, the time can be reduced correspondingly.

In the present invention, while meta-information is expanded in the memory, not meta-information on all the files but only meta-information on the files to be preferred-recalled is expanded. The number of files to be preferred-recalled is considerably smaller than that of all the files, for example, 0.1% of all the files. Thus, it takes about 10 minutes for one million files, but for 0.1% of one million files, 1,000 files, which takes only one second or less to be expanded in the memory.

In the above example, while 0.1% of all the files is to be preferred-recalled, preferred recall of all the files needs to expand meta-information on the memory but does not need to build dcache files in the shared disk 47, which takes 10 or more times as long as that taken for expansion, thus remarkably reducing the time taken to resume the operations.

Although the method, the program, and the data processing system for restoring data according to the present invention have been described in detail with reference to the drawings, it is to be understood that the present invention can be changed within the scope of consideration of those skilled in the art, for example, other embodiments, addition, modification, and deletion, and the any forms are included in the scope of the present invention as long as the operational advantages of the present invention are given.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A data processing system for restoring a plurality of pieces of data, the system comprising:
   one or more processing units that execute the process on the plurality of pieces of data as a plurality of files;
   one or more memories that provide one or more storage areas in which each of the one or more processing units executes the process on the plurality of files;
   a storage device capable of storing a program configured to be executed by the one or more processing units using information on one or more of the plurality of files and the one or more files, the program configured to perform a method comprising:
      storing management information for managing a plurality of pieces of data as a plurality of files in a storage device provided in the data processing system to restore the management information, the data including medium identification information for identifying recording media associated with the individual plurality of pieces of data;
      accepting connection of the plurality of recording media storing the plurality of files and information on the plurality of files;
      storing information on one or more of the plurality of files including one or more pieces of the medium identification information in the storage device, the one or more files comprising less than 0.1% of the plurality of files, wherein the one or more files are grouped by respective tape identifiers in a preferred-recall list, wherein preferred recall is executed on files written within 48 hours before backup, wherein respective groups are sorted by block numbers associated with respective files of the one or more files, and wherein the information for respective files of the one or more files comprises a respective file name, a respective file path, a respective physical position, a respective access control list, and respective extended attributes of the respective file;
      switching to a setting for reading the one or more files using the information on the one or more files, the information being stored in the storage device, instead of the information on the plurality of files, the information being stored in the plurality of recording media, wherein switching to a setting for reading the one or more files using the information on the one or more files further comprises designating an option for mounting a tape file system without forming dcache files, wherein designating the option causes only dentry files to be created for respective files in the preferred-recall list and no dcache file to be created;
      identifying one or more recording media from which the one or more files are to be read on the basis of the information on the one or more files and reading the one or more files from the identified one or more recording media to the storage device, wherein identifying one or more recording media further comprises identifying the one or more recording media based on respective tape identifiers located in respective file names for the one or more files;
      deleting the information on the one or more files from the storage device by unmounting the tape file system;
      switching to a second setting for reading the plurality of files using the information on the files stored in the plurality of recording media, wherein the second setting further comprises undesignating the option for mounting a tape file system without forming dcache files; and
      with a second data processing system that holds the plurality of files, executing a process of writing the plurality of files to the plurality of recording media, wherein respective files of the plurality of files are in a resident state during writing the plurality of files, wherein the resident state comprises a state in which the file on the drive is deleted and the entity of the file is present only in a shared disk.

* * * * *